(12) United States Patent
Hsieh

(10) Patent No.: US 9,410,859 B2
(45) Date of Patent: Aug. 9, 2016

(54) BIAXIAL TORQUE MEASURING DEVICE

(71) Applicant: KABO TOOL COMPANY, Taichung (TW)

(72) Inventor: Chih-Ching Hsieh, Taichung (TW)

(73) Assignee: KABO TOOL COMPANY, Taichung (TW)

( * ) Notice: Subject to any disclaimer, the term of this patent is extended or adjusted under 35 U.S.C. 154(b) by 0 days.

(21) Appl. No.: 14/842,820

(22) Filed: Sep. 1, 2015

(65) Prior Publication Data
US 2016/0146684 A1    May 26, 2016

(30) Foreign Application Priority Data

Nov. 24, 2014   (TW) .............................. 103140638 A

(51) Int. Cl.
| | | |
|---|---|---|
| *B25B 21/00* | (2006.01) | |
| *G01L 5/24* | (2006.01) | |
| *G01L 25/00* | (2006.01) | |
| *G01L 5/00* | (2006.01) | |

(52) U.S. Cl.
CPC . *G01L 5/24* (2013.01); *B25B 21/00* (2013.01); *G01L 25/00* (2013.01); *G01L 5/0042* (2013.01)

(58) Field of Classification Search
CPC ....... G01L 25/003; G01L 5/24; G01L 5/0042; G05D 17/02
USPC .......................................... 73/862.21–862.25
See application file for complete search history.

(56) References Cited

U.S. PATENT DOCUMENTS

| | | | | |
|---|---|---|---|---|
| 5,186,083 A | * | 2/1993 | Hsiao ..................... | B25B 13/06 81/124.4 |
| 6,796,190 B2 | * | 9/2004 | Curry ..................... | B25G 1/063 73/862.21 |
| 8,413,525 B1 | * | 4/2013 | Schultz .................. | B25B 23/14 73/862.21 |

* cited by examiner

*Primary Examiner* — Max Noori
(74) *Attorney, Agent, or Firm* — CKC & Partners Co., Ltd.

(57) ABSTRACT

A biaxial torque measuring device includes a base and two torque sensing shafts. The torque sensing shafts are disposed on the base, wherein one of the torque sensing shafts is axially parallel to a surface of the base, the other torque sensing shaft has an angle relative to the surface of the base, the angle is greater than 0 degree and smaller than 180 degrees, and each of the torque sensing shafts has a sensing portion for sensing a torque value.

11 Claims, 8 Drawing Sheets

BIAXIAL TORQUE MEASURING DEVICE

RELATED APPLICATIONS

This application claims priority to Taiwan Application Serial Number 103140638, filed Nov. 24, 2014, which is herein incorporated by reference.

BACKGROUND

1. Technical Field

The present disclosure relates to a torque measuring device. More particularly, the present disclosure relates to a biaxial torque measuring device.

2. Description of Related Art

In the field of aviation machinery or precision machinery, a user must precisely control a torque value for properly tightening fasteners such as screws or bolts. Therefore, the torque value of the wrenches or screwdrivers must be regularly corrected so as to maintain the precision thereof.

Conventionally, torque measuring devices are fixed on a work table for increasing the measurement precision and facilitating the operation. For allowing a user to use the torque measuring devices at anytime and anywhere, torque measuring devices which are portable or can be connected on a socket are developed.

However, the aforementioned torque measuring devices mostly have a single torque sensing shaft for sensing a single torque value. Other torque measuring devices having two torque sensing shafts with different sizes are developed, which can sense different torque values via the two torque sensing shafts thereof. However, the two torque sensing shafts are axially parallel to each other. The two torque sensing shafts tend to interfere each other during operation, and occupy a larger volume. Therefore, the inventor improves the structure of the torque measuring devices and provides a biaxial torque measuring device for facilitating the user to sense two torque values at the same time.

SUMMARY

According to one aspect of the present disclosure, a biaxial torque measuring device includes a base and two torque sensing shafts. The torque sensing shafts are disposed on the base, wherein one of the torque sensing shafts is axially parallel to a surface of the base, and the other torque sensing shaft has an angle relative to the surface of the base, the angle is greater than 0 degree and smaller than 180 degrees, and each of the torque sensing shafts has a sensing portion for sensing a torque value.

According to another aspect of the present disclosure, a biaxial torque measuring device includes a base, a first torque sensing shaft and a second torque sensing shaft. The first torque sensing shaft includes a first sensing portion and a first supporting portion, wherein the first sensing portion is for sensing a first torque value, the first supporting portion fixedly disposed on the base connects the first sensing portion to the base, and the first sensing portion is axially parallel to a surface of the base. The second torque sensing shaft includes a second sensing portion and a second supporting portion, wherein the second sensing portion is for sensing a second torque value, the second supporting portion fixedly disposed on the base connects the second sensing portion to the base, and the second sensing portion has an angle of 90 degrees relative to the surface of the base.

According to yet another aspect of the present disclosure, a biaxial torque measuring device includes a base, a first torque sensing shaft and a second torque sensing shaft. The first torque sensing shaft includes a first sensing portion and a first supporting portion, wherein the first sensing portion is for sensing a first torque value, the first supporting base fixedly disposed on the base connects the first sensing portion to the base, and the first sensing portion is axially parallel to a surface of the base. The second torque sensing shaft includes a second sensing portion and a second supporting portion, wherein the second sensing portion is for sensing a second torque value, the second supporting portion disposed on the base connects the second sensing portion to the base, and the second sensing portion has an angle of 45 degrees relative to the surface of the base.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
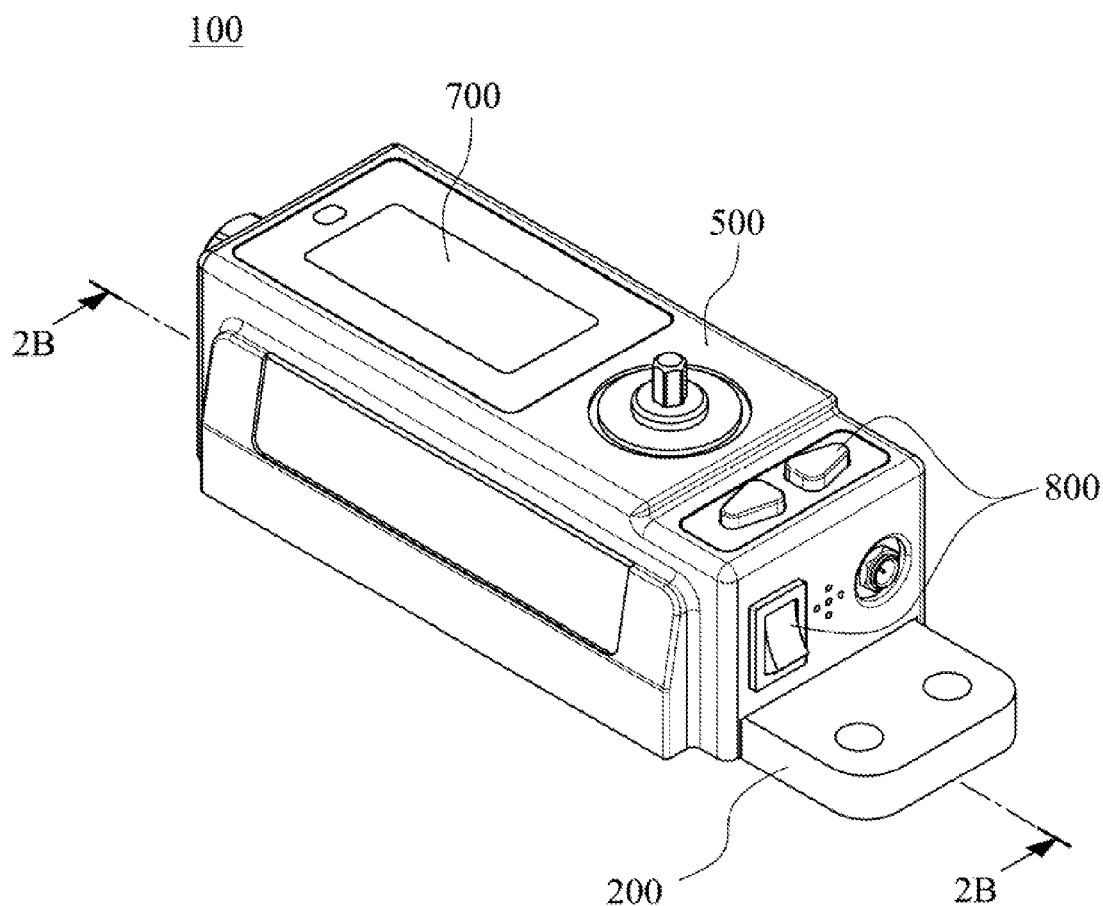
FIG. 1 is a three-dimensional schematic view of a biaxial torque measuring device according to one embodiment of the present disclosure.
Figure 2A:
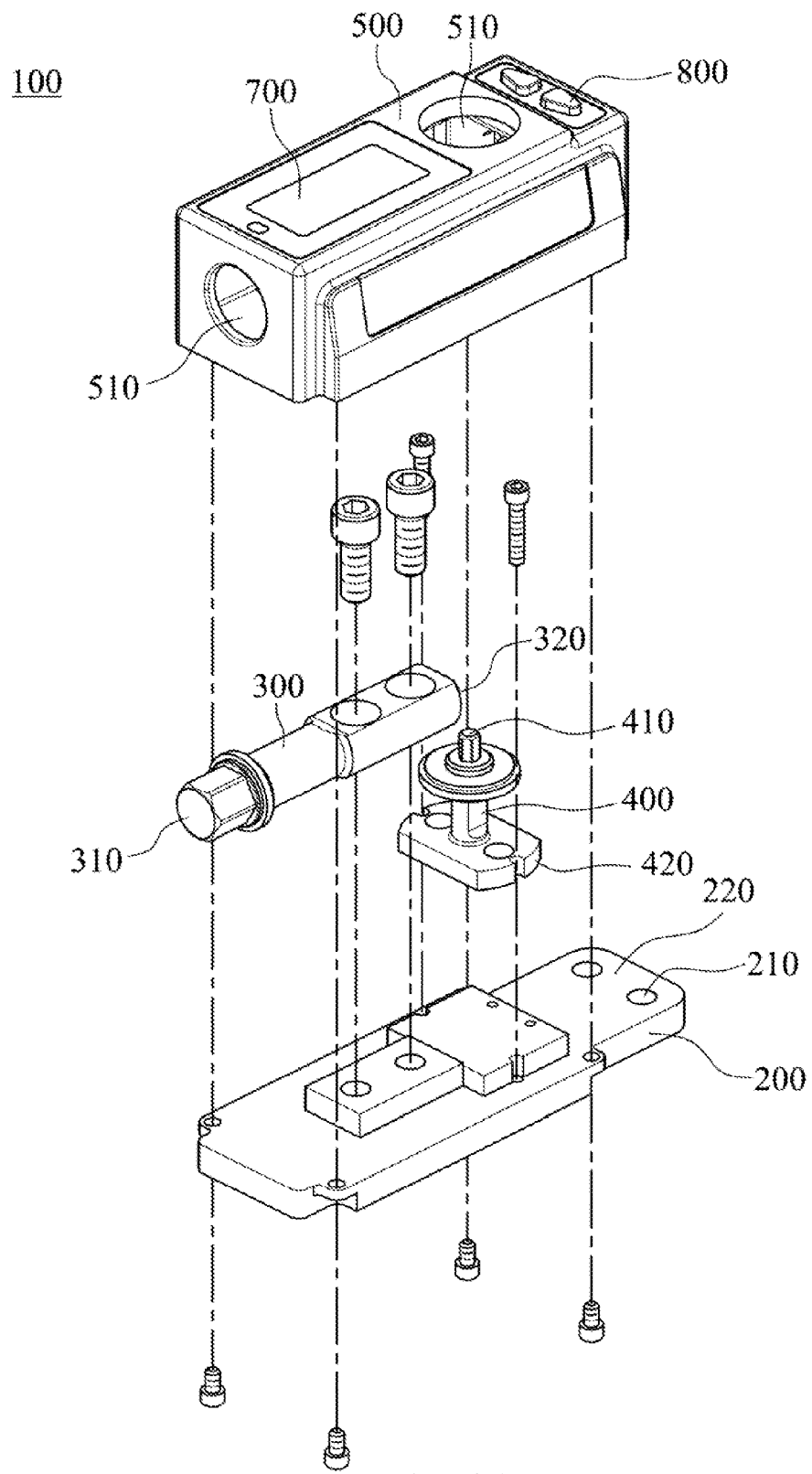
FIG. 2A is an exploded schematic view of the biaxial torque measuring device in FIG. 1.
Figure 2B:
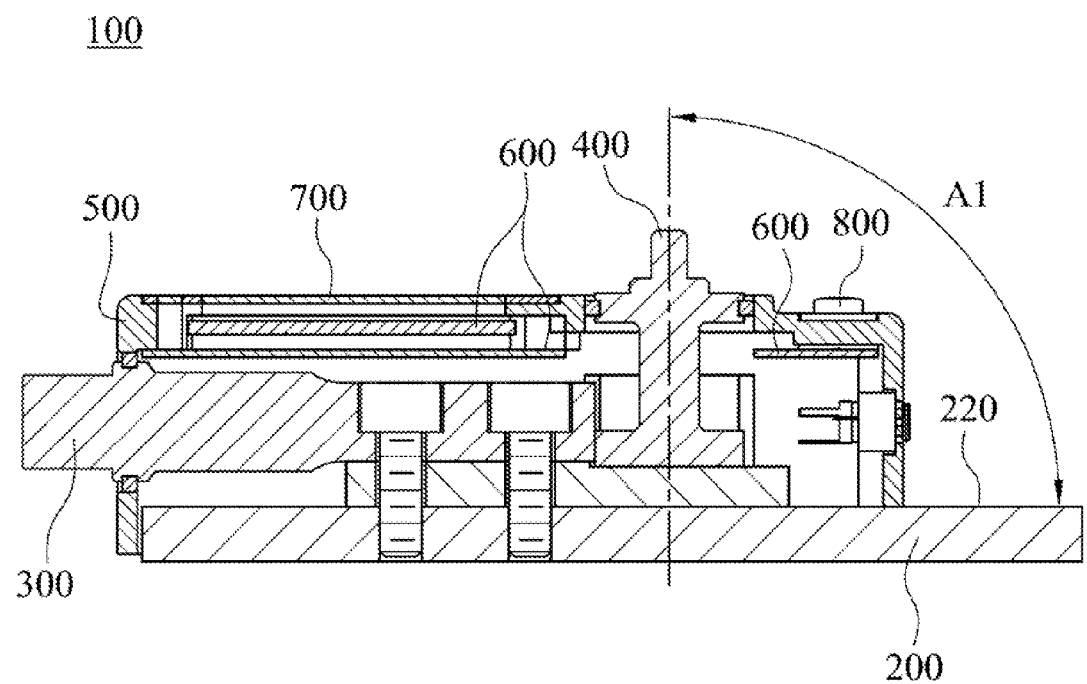
FIG. 2B is a cross-sectional view taken along line 2B-2B of the biaxial torque measuring device in FIG. 1.
Figure 3:
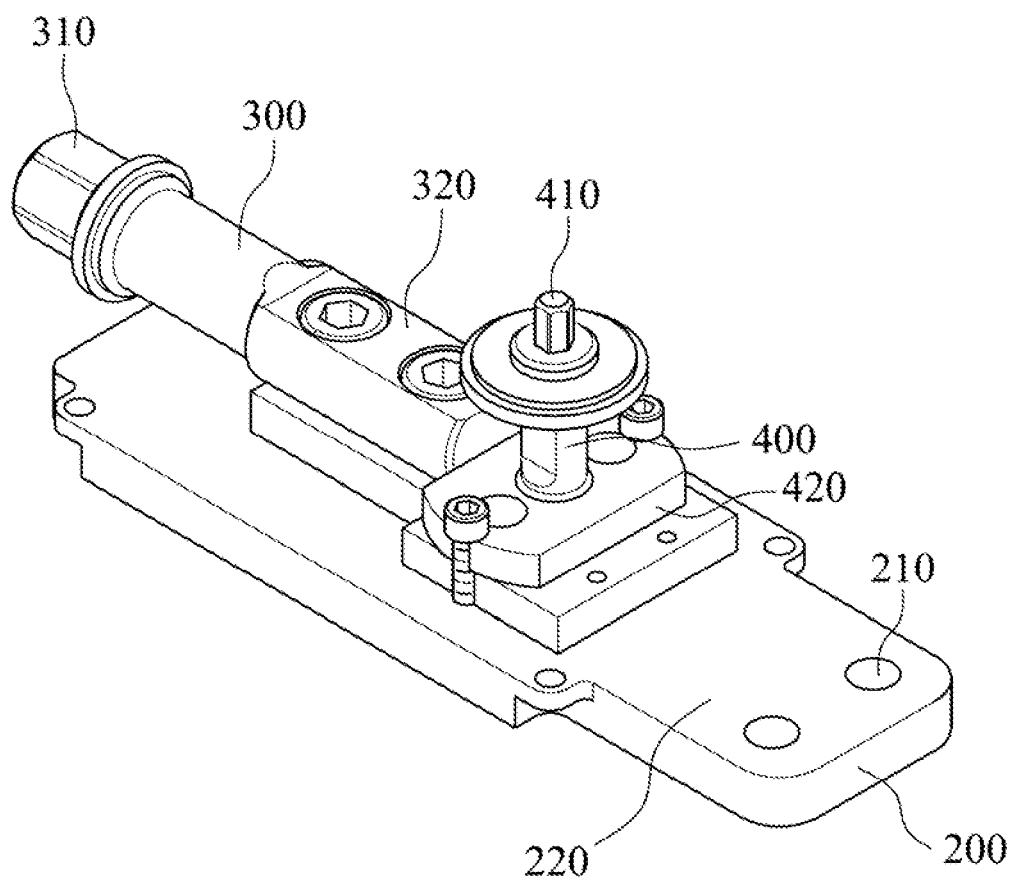
FIG. 3 is a schematic view showing the interior of the biaxial torque measuring device in FIG. 1.

FIG. 1 is a three-dimensional schematic view of a biaxial torque measuring device 100 according to one embodiment of the present disclosure. FIG. 2A is an exploded schematic view of the biaxial torque measuring device 100 in FIG. 1. FIG. 2B is a cross-sectional view taken along line 2B-2B of the biaxial torque measuring device 100 in FIG. 1. FIG. 3 is a schematic view showing the interior of the biaxial torque measuring device 100 in FIG. 1. The biaxial torque measuring device 100 includes a base 200, a first torque sensing shaft 300, a second torque sensing shaft 400, a shell 500, a control circuit 600, a displayer 700 and a plurality of control elements 800.

The first torque sensing shaft 300, the second torque sensing shaft 400 and the shell 500 are disposed on the base 200. The base 200 includes a plurality screw holes 210 for allowing the first torque sensing shaft 300, the second torque sensing shaft 400 and the shell 500 to be fixed on the base 200 by screws and for allowing the base 200 to be fixed on a work platform, such as a desktop, by screws.

The first torque sensing shaft 300 includes a first sensing portion 310 and a first supporting portion 320. The first sensing portion 310 has a sensor (not shown) disposed therein. The sensor is for sensing a first torque value. The first supporting portion 320 is fixed disposed on the base 200 via two screws (the reference numerals are omitted). The first supporting portion 320 connects the first sensing portion 310 to the base 200, and the first sensing portion 310 is axially parallel to a surface 220 of the base 200, that is, the first torque sensing shaft 300 is axially parallel to the surface 220 of the base 200.

The second torque sensing shaft 400 includes a second sensing portion 410 and a second supporting portion 420. The second sensing portion 410 has a sensor (not shown) disposed therein. The sensor is for sensing a second torque value. The second supporting portion 420 is fixedly disposed on the base 200 via two screws (the reference numerals are omitted). The second supporting portion 420 connects the second sensing portion 410 to the base 200, and the second sensing portion 410 has an angle A1 relative to the surface 220 of the base 200, that is, the second torque sensing shaft 400 has the angle A1 relative to the surface 220 of the base 200. The angle A1 can be greater than 0 degree and smaller than 180 degrees, so that the first torque sensing shaft 300 and the second torque sensing shaft 400 are not axially parallel to each other. In the embodiment, the angle A1 equals to 90 degrees. In other embodiments, the angle A1 can be any other angle which is greater than 0 degree and smaller than 180 degrees.

The shell 500 covers the base 200 and is fixed on the base 200 via four screws (the reference numerals are omitted). The shell 500 is configured to protect the first torque sensing shaft 300 and the second torque sensing shaft 400. Furthermore, the shell 500 includes two holes 510 for the first sensing portion 310 and the second sensing portion 410 to respectively protrude therefrom.

The control circuit 600 is disposed on the shell 500 and connected with the first sensing portion 310 and the second sensing portion 410. The control circuit 600 is for calculating the first torque value obtained by the first sensing portion 310 and the second torque value obtained by the second sensing portion 410.

The displayer 700 is disposed on the shell 500 and electrically connected with the control circuit 600 for showing the first torque value obtained by the first sensing portion 310 and/or the second torque value obtained by the second sensing portion 410.

The control elements 800 are disposed on the shell 500 and electrically connected with the control circuit 600. One of the control elements 800 is for switching on or switching off the control circuit 600, and two of the control elements 800 are for selecting a sensing direction of the first sensing portion 310 or a sensing direction of the second sensing portion 410, respectively.

The biaxial torque measuring device 100 allows a user to sense the torque values of different hand tools or power tools via the first sensing portion 310 and the second sensing portion 410, respectively. Furthermore, the first torque sensing shaft 300 and the second torque sensing shaft 400 are not axially parallel to each other, and the angle A1 can be greater than 0 degree and smaller than 180 degrees, which allows the user to sense the torque value in accordance with the habitual operation direction of the hand tools or power tools. Therefore, the process of sensing torque becomes more ergonomic, and the interference between the first sensing portion 310 and the second sensing portion 410 can be avoided. Furthermore, the user can select the sensing direction of the first sensing portion 310 to be counterclockwise or clockwise via the control elements 800. Similarly, the user can select the sensing direction of the second sensing portion 410 to be counterclockwise or clockwise via the control elements 800.

Figure 4A:
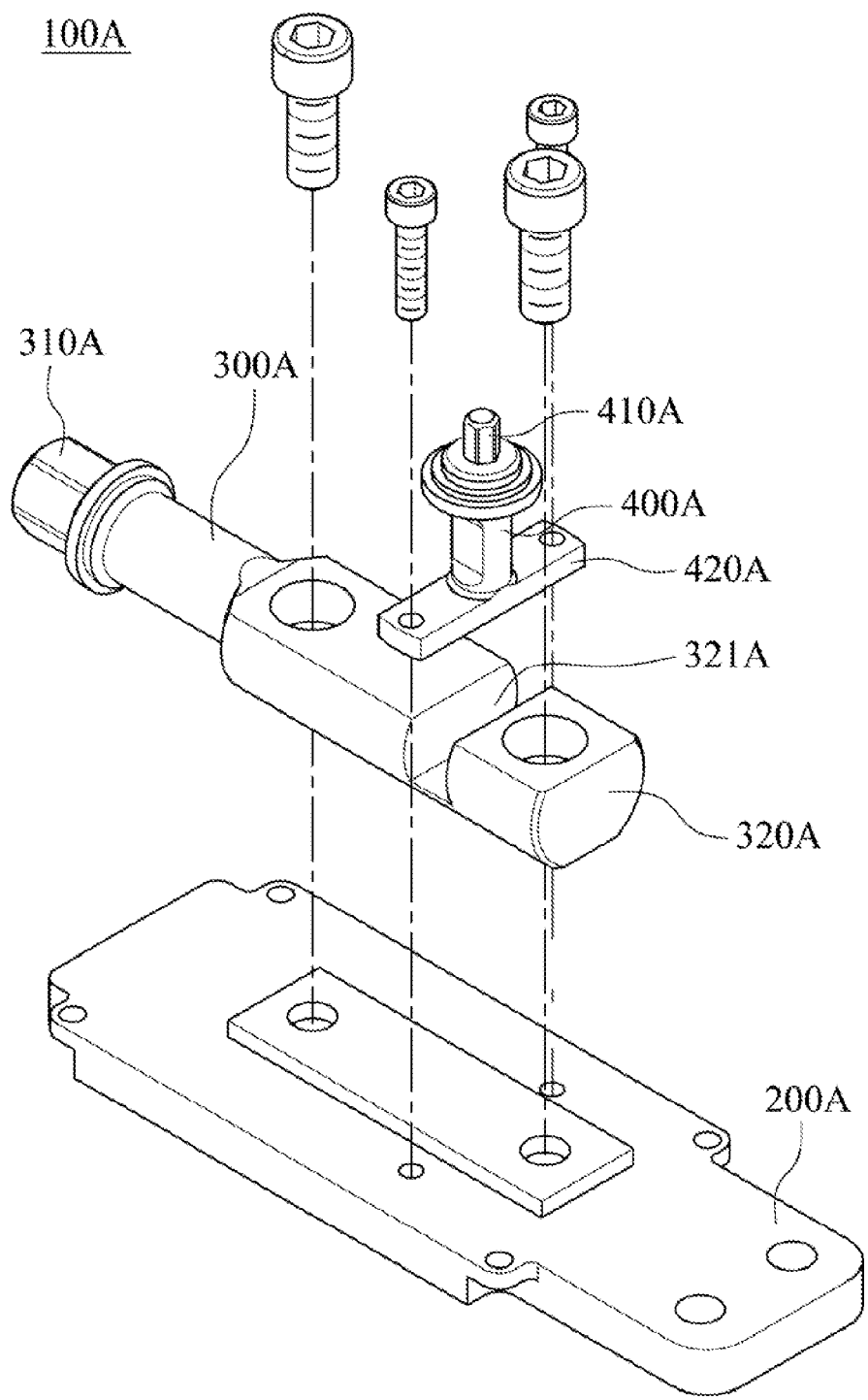
FIG. 4A is an exploded schematic view of a biaxial torque measuring device according to another embodiment of the present disclosure.
Figure 4B:
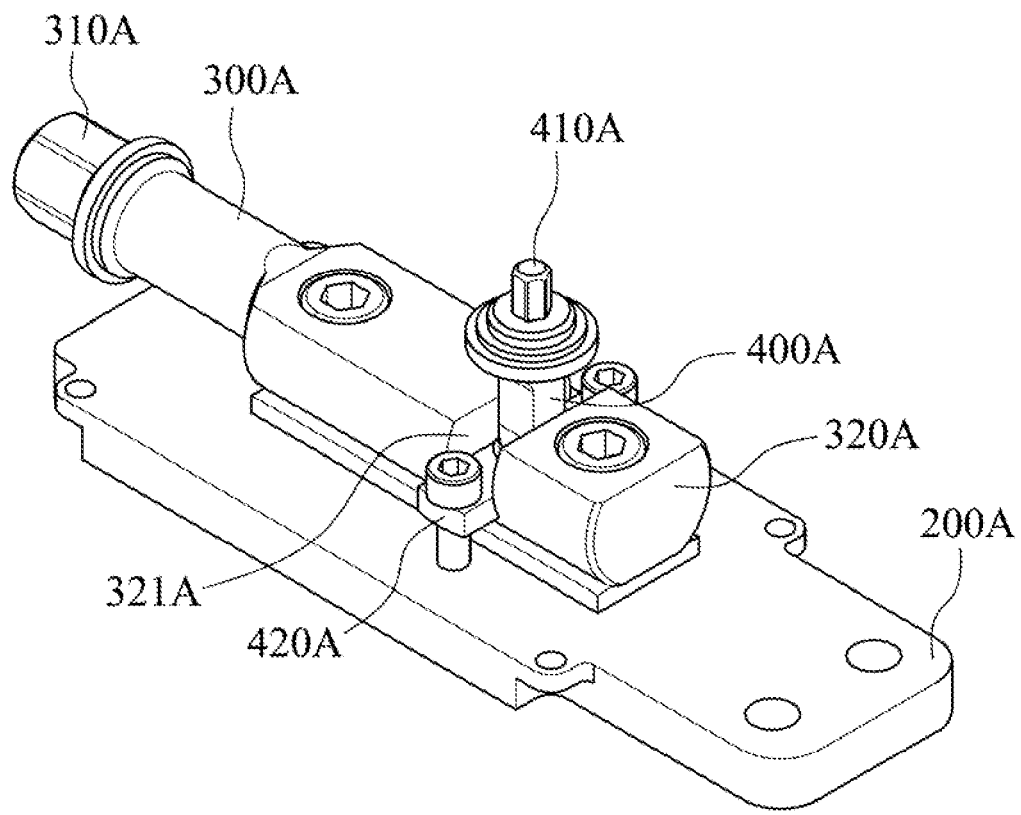
FIG. 4B is a combination schematic view of the biaxial torque measuring device in FIG. 4A.

FIG. 4A is an exploded schematic view of a biaxial torque measuring device 100A according to another embodiment of the present disclosure. FIG. 4B is a combination schematic view of the biaxial torque measuring device 100A in FIG. 4A. The biaxial torque measuring device 100A includes a base 200A, a first torque sensing shaft 300A and a second torque sensing shaft 400A.

In FIGS. 4A and 4B, a shell, a displayer, control elements and a control circuit of the biaxial torque measuring device 100A are omitted for illustrating the relationship of the base 200A, the first torque sensing shaft 300A and the second torque sensing shaft 400A.

In the embodiment, the first torque sensing shaft 300A has a groove 321A formed on the first supporting portion 320A. The groove 321A is correspondent to the second supporting portion 420A of the second torque sensing shaft 400A, and the second supporting portion 420A is engaged in the groove 321A. Therefore, the first torque sensing shaft 300A and the second torque sensing shaft 400A can be disposed on the base 200 more stably. Furthermore, the first sensing portion 310A and the second sensing portion 410A will not interfere with each other while sensing torque values.

Figure 5A:
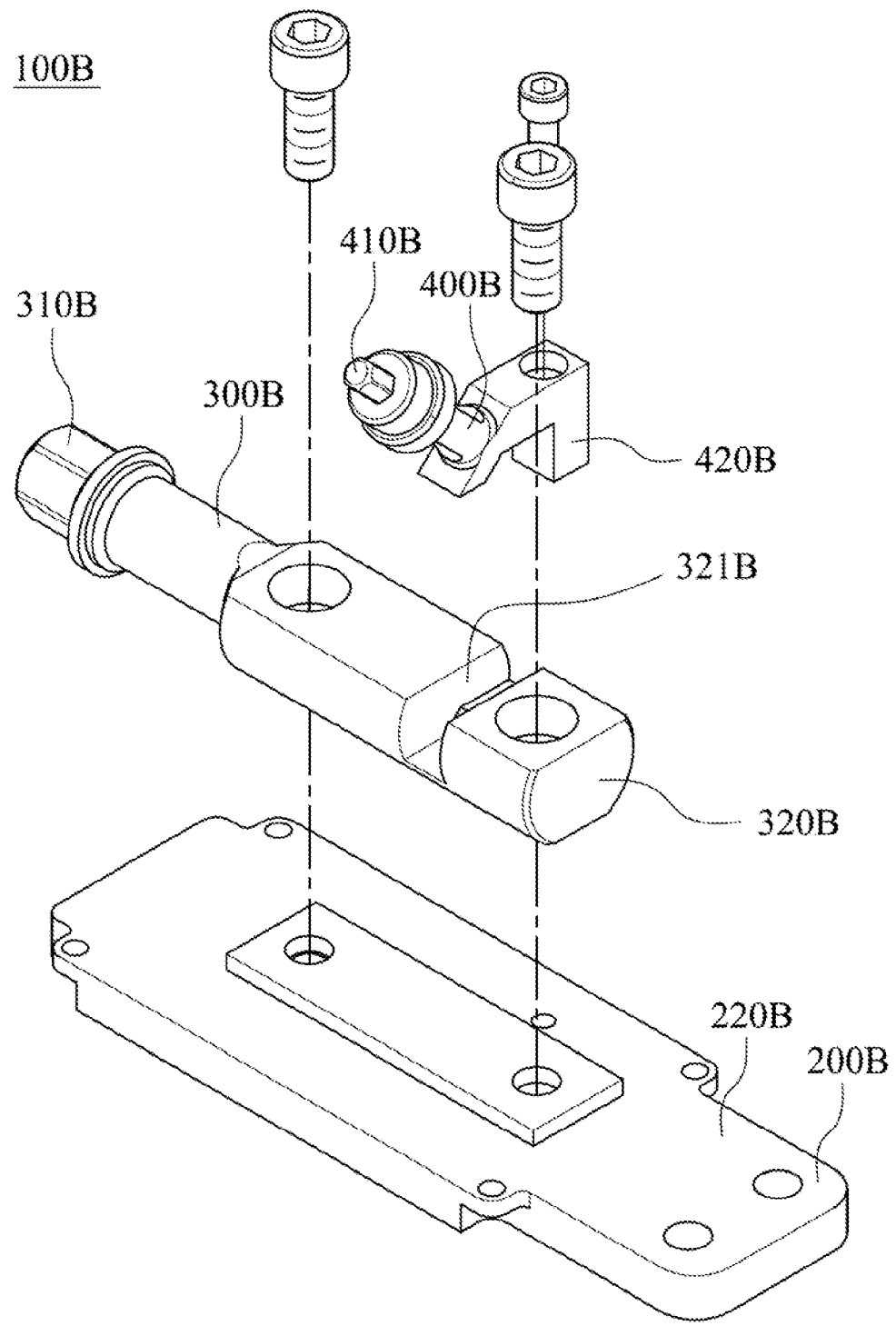
FIG. 5A is an exploded schematic view of a biaxial torque measuring device according to yet another embodiment of the present disclosure.
Figure 5B:
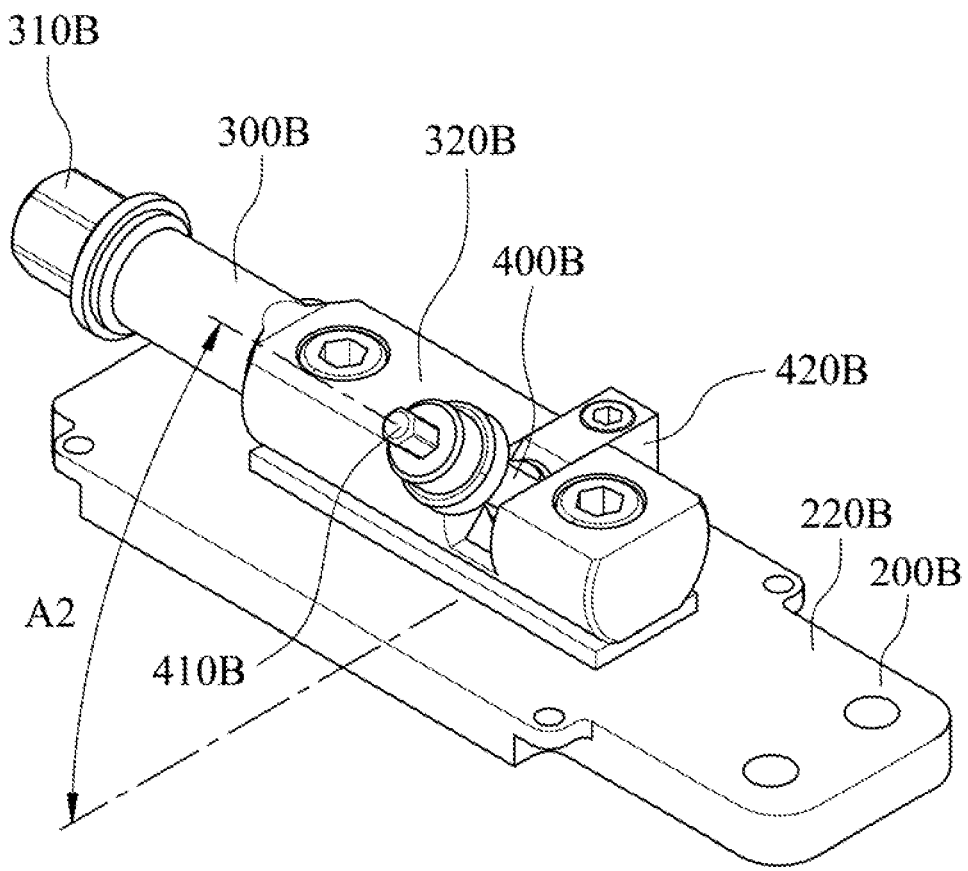
FIG. 5B is a combination schematic view of the biaxial torque measuring device in FIG. 5A.

FIG. 5A is an exploded schematic view of a biaxial torque measuring device 100B according to yet another embodiment of the present disclosure. FIG. 5B is a combination schematic view of the biaxial torque measuring device 100B in FIG. 5A. The biaxial torque measuring device 100B includes a base 200B, a first torque sensing shaft 300B and a second torque sensing shaft 400B.

In FIGS. 5A and 5B, a shell, a displayer, control elements and a control circuit of the biaxial torque measuring device 100B are omitted for illustrating the relationship of the base 200B the first torque sensing shaft 300B and the second torque sensing shaft 400B.

In the embodiment, the first torque sensing shaft 300B has a groove 321B formed on the first supporting portion 320B. The groove 321B is correspondent to the second supporting portion 420B of the second torque sensing shaft 400B, the second supporting portion 420A is engaged in the groove 321B, and the second sensing portion 410B has an angle A2 of 45 degrees relative to the surface 220B of the base 200B. Therefore, the second torque sensing shaft 400B can be used to sense the torque value of the hand tools or power tools whose operation directions are different from the axial direction of the first torque sensing shaft 300B.

To sum up, the biaxial torque measuring device according to the present disclosure has advantages as follows.

First, the first torque sensing shaft and the second torque sensing shaft are not axially parallel to each other. In other words, the operation direction of the first torque sensing shaft is different from that of the second torque sensing shaft, which can prevent the interference between the first torque sensing shaft and the second torque sensing shaft. Accordingly, the user can use the first torque sensing shaft and the second torque sensing shaft to sense torque values of different hand tools or power tools at the same time, which improves the operation convenience.

Second, the angle between the second torque sensing shaft and the surface of the base can be greater than 0 degree and smaller than 180 degrees, which allows the user to sense the torque value in accordance with the habitual operation direction of the hand tools or power tools. Therefore, the process of sensing torque becomes more ergonomic, and the biaxial torque measuring device can be applied to more hand tools or power tools whose operation directions are different.

It will be apparent to those skilled in the art that various modifications and variations can be made to the structure of the present disclosure without departing from the scope or spirit of the disclosure. In view of the foregoing, it is intended that the present disclosure cover modifications and variations of this invention provided they fall within the scope of the following claims.

What is claimed is:

1. A biaxial torque measuring device, comprising:
    a base; and
    two torque sensing shafts disposed on the base, wherein one of the torque sensing shafts is axially parallel to a surface of the base, the other torque sensing shaft has an angle relative to the surface of the base, the angle is greater than 0 degree and smaller than 180 degrees, and each of the torque sensing shafts has a sensing portion for sensing a torque value.

2. The biaxial torque measuring device of claim , wherein the angle is 45 degrees.

3. The biaxial torque measuring device of claim 1, wherein the angle is 90 degrees.

4. A biaxial torque measuring device, comprising:
    a base;
    a first torque sensing shaft comprising a first sensing portion and a first supporting portion, wherein the first sensing portion is for sensing a first torque value, the first supporting portion fixedly disposed on the base connects the first sensing portion to the base, and the first sensing portion is axially parallel to a surface of the base; and
    a second torque sensing shaft comprising a second sensing portion and a second supporting portion, wherein the second sensing portion is for sensing a second torque value, the second supporting portion fixedly disposed on the base connects the second sensing portion to the base, and the second sensing portion has an angle of 90 degrees relative to the surface of the base.

5. The biaxial torque measuring device of claim 4, wherein the first supporting portion comprises a groove correspondent to the second supporting portion, and the second supporting portion is engaged in the groove.

6. The biaxial torque measuring device of claim 4, further comprising:
    a shell covering the base, wherein the shell comprises two holes for the first torque sensing shaft and the second torque sensing shaft to respectively protrude therefrom.

7. The biaxial torque measuring device of claim 6, further comprising:
    a control circuit disposed on the shell and connected with the first sensing portion and the second sensing portion;
    a displayer disposed on the shell and electrically connected with the control circuit for showing the first torque value or the second torque value; and
    a control element disposed on the shell and electrically connected with the control circuit, wherein the control element is for switching on or switching off the control circuit, or selecting a sensing direction of the first sensing portion or a sensing direction of the second sensing portion.

8. A biaxial torque measuring device, comprising:
    a base;
    a first torque sensing shaft comprising a first sensing portion and a first supporting portion, wherein the first sensing portion is for sensing a first torque value, the first supporting base fixedly disposed on the base connects the first sensing portion to the base, and the first sensing portion is axially parallel to a surface of the base; and
    a second torque sensing shaft comprising a second sensing portion and a second supporting portion, wherein the second sensing portion is for sensing a second torque value, the second supporting portion fixedly disposed on the base connects the second sensing portion to the base, and the second sensing portion has an angle of 45 degrees relative to the surface of the base.

9. The biaxial torque measuring device of claim 8, wherein the first supporting portion comprises a groove correspondent to the second supporting portion, and the second supporting portion is engaged in the groove.

10. The biaxial torque measuring device of claim 8, further comprising:
    a shell fixedly disposed on the base, wherein the shell comprises two holes for the first torque sensing shaft and the second torque sensing shaft to respectively protrude therefrom.

11. The biaxial torque measuring device of claim 10, further comprising:
    a control circuit disposed on the shell and connected with the first sensing portion and the second sensing portion;
    a displayer disposed on the shell and electrically connected with the control circuit for showing the first torque value or the second torque value; and
    a control element disposed on the shell and electrically connected with the control circuit, wherein the control element is for switching on or switching off the control circuit, or selecting a sensing direction of the first sensing portion or a sensing direction of the second sensing portion.

* * * * *